Figure 1:
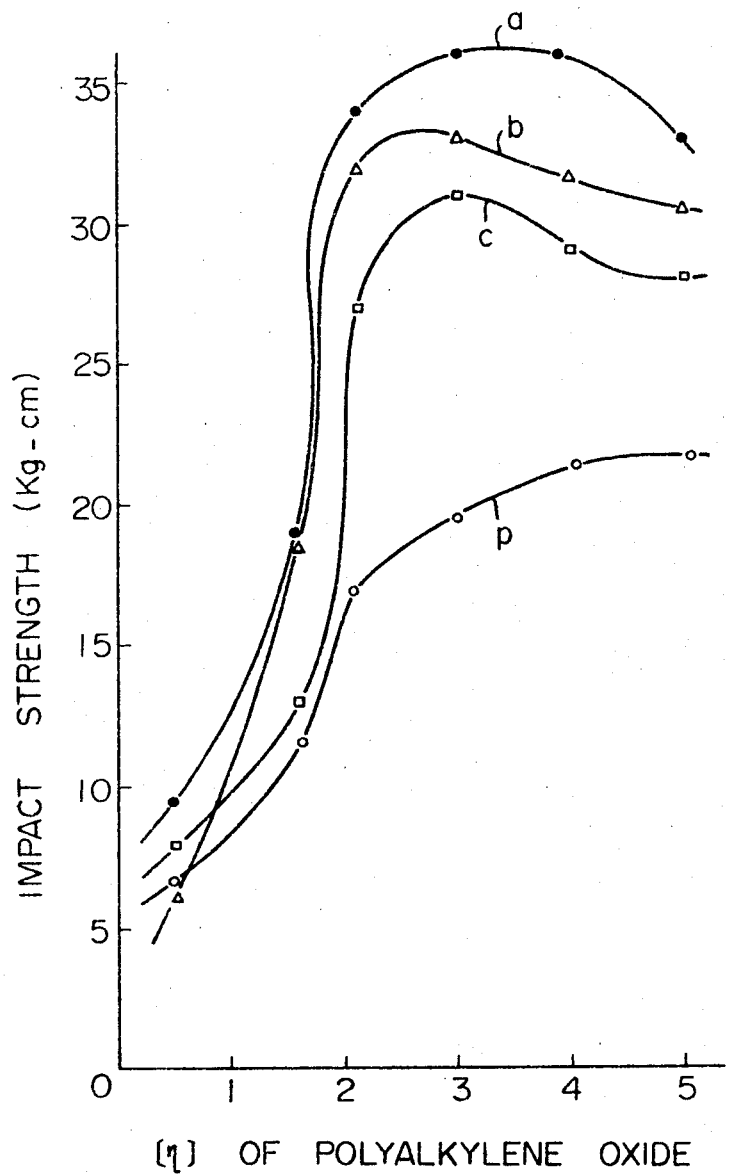

United States Patent [19] [11] 3,725,507
Nakano et al. [45] Apr. 3, 1973

[54] PROCESS FOR THE PREPARATION OF VINYL CHLORIDE GRAFT POLYMERS

[75] Inventors: Satoshi Nakano; Keiichi Azuma; Seiichiro Oba; Samon Wakizaka; Sunichi Nakamura, all of Tokuyama, Japan

[73] Assignees: Tokuyama Soda Kabushiki Kaisha; Sun Arrow Chemical Co., Ltd., Yomaguchi-ken, Japan; part interest to each

[22] Filed: Oct. 27, 1971

[21] Appl. No.: 192,895

Related U.S. Application Data

[63] Continuation-in-part of Ser. No. 878,948, Nov. 21, 1969, abandoned.

[30] Foreign Application Priority Data

Nov. 26, 1968 Japan ..................................43/86083

[52] U.S. Cl. ..........260/896, 260/28.5 D, 260/897 C, 260/899
[51] Int. Cl. .........................C08f 37/18, C08f 29/24
[58] Field of Search......................260/896, 897, 899

[56] References Cited

UNITED STATES PATENTS 3,247,291    4/1966    Kahrs...................................260/899

Primary Examiner—Samuel H. Blech
Assistant Examiner—C. J. Seccuro
Attorney—Leonard W. Sherman et al.

[57] ABSTRACT

A process for the preparation of a vinyl chloride polymer composition, which comprises (a) dissolving an oil-soluble polyalkylene oxide such as polypropylene oxide, or a copolymer of propylene oxide in the 1-butene oxide or epichlorohydrin, in a monomeric mixture consisting of 99.5 – 90 parts of a vinyl chloride monomer and 0.5 – 10 parts of a comonomer such as ethylene, propylene or 1-butene, the amount of said oil-soluble polyalkylene oxide being 0.5 – 5 percent by weight based on the monomeric mixture, (b) emulsifying or suspending the resulting solution in water, (c) polymerizing the emulsified or suspended solution and (d) recovering the resulting polymer composition. The vinyl chloride polymer composition obtained has very high impact strength even at low temperatures, and same good transparency and other physical properties as polyvinyl chloride.

4 Claims, 4 Drawing Figures

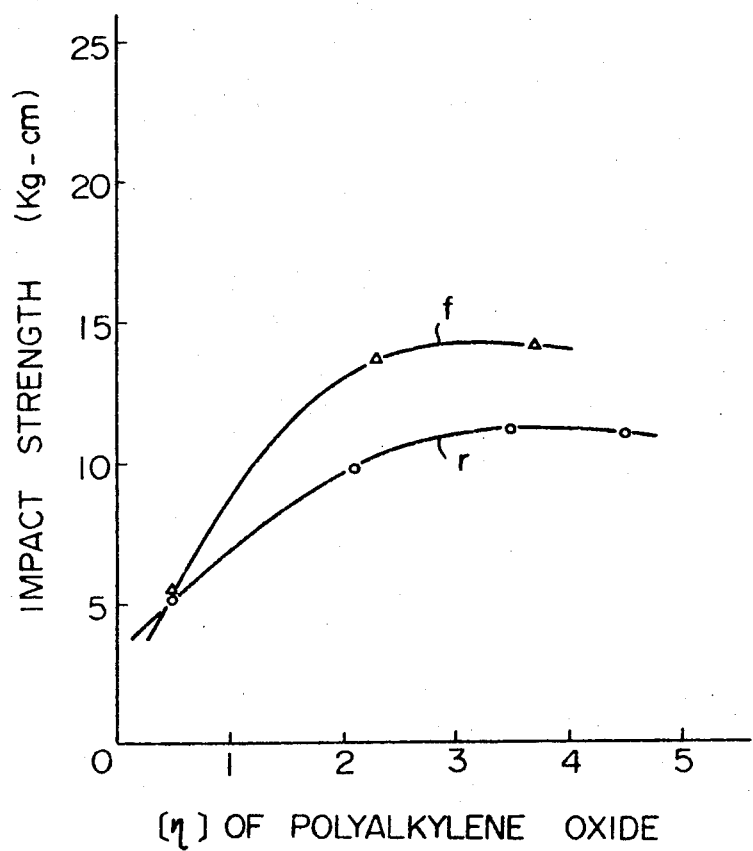

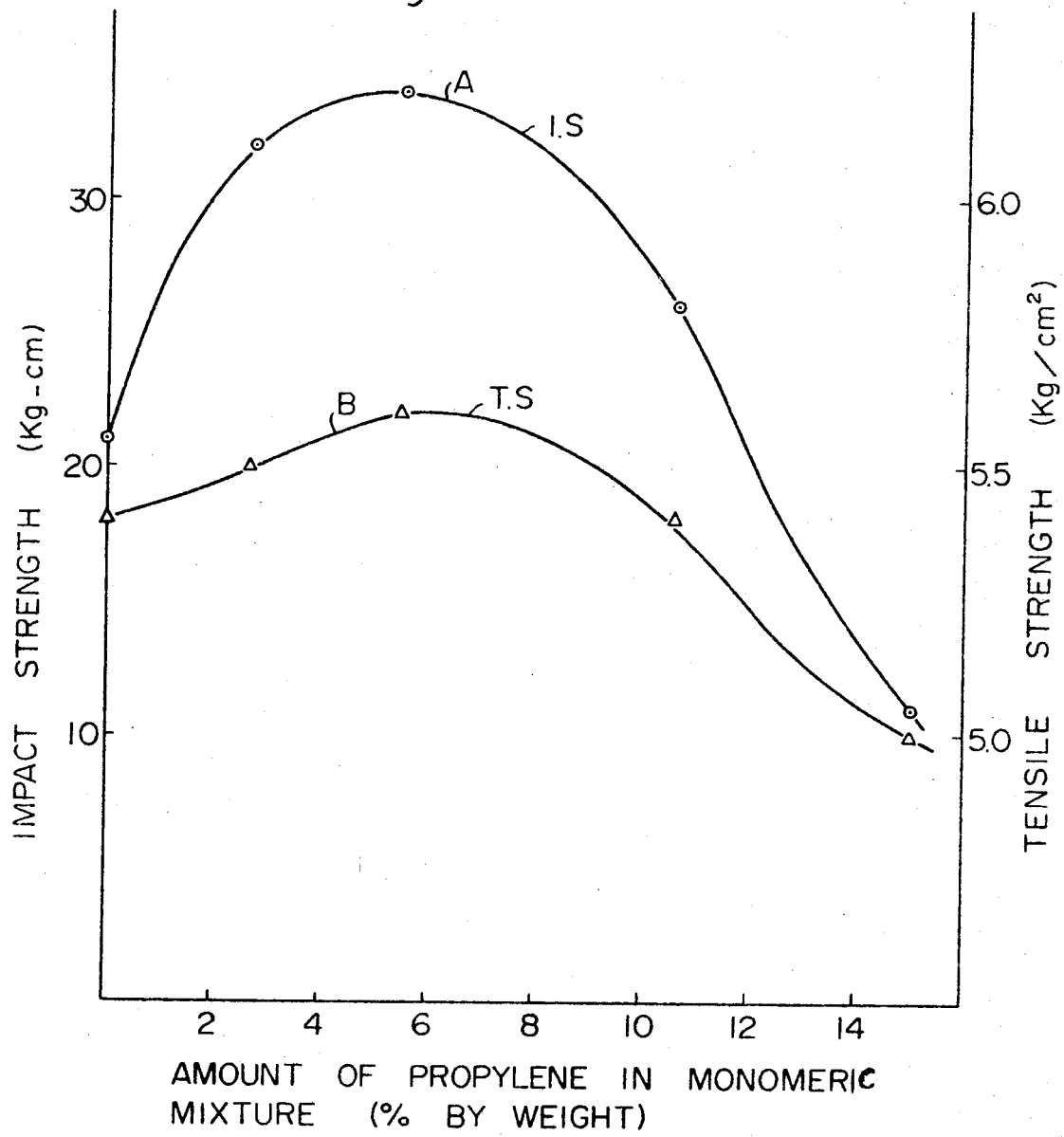

PROCESS FOR THE PREPARATION OF VINYL CHLORIDE GRAFT POLYMERS

This application is a continuation-in-part application of the application Ser. No. 878,948 file on Nov. 21, 1969, which has now been abandoned.

This invention relates to a process for the preparation of a vinyl chloride polymer composition having an improved impact strength. More particularly, the invention relates to a process for the preparation of a vinyl chloride graft polymer of an excellent impact strength, which comprises dissolving an oil-soluble alkylene oxide polymer in a monomeric mixture of vinyl chloride and an α-olefin monomer, and polymerizing said monomeric mixture.

Polyvinyl chloride has heretofore found wide utility as a low cost synthetic resin in film, sheet and other shaped products. It has also been practised to copolymerize monomeric vinyl chloride with vinyl acetate, vinyl ether, α-olefins, etc., to provide vinyl chloride polymers of good workability as well as high transperency. However, vinyl chloride polymers, in general, have a defect that the impact strength is low. This defect is particularly conspicuous with a vinyl chloride polymer of a low degree of polymerization exhibiting good workability, e.g., of the degree of polymerization ranging from 600 to 800. This defect has not allowed the full utilization of various excellent properties of polyvinyl chloride in many fields. For example, polyvinyl chloride is not widely used in the field of architecture, because construction materials such as sheet, bolt, bottle, pipe, combination joint, and window frame require a high level of impact strength. Accordingly, improvement in the impact strength in polyvinyl chloride is an important research problem, and various proposals have already been made. For example, it is known to blend polyvinyl chloride with polymers having a low glass transition temperature, such as an acrylonitrile/butadiene/styrene copolymer and an ethylene/vinyl acetate copolymer, or to blend polyvinyl chloride with chlorinated polyethylene. Also there has been proposed a process in which polyvinyl chloride is grafted to a copolymer such as mentioned above. However, in these known methods it is generally necessary to use large amounts of such impact strength-improving components to be blended or graft-polymerized with polyvinyl chloride, in order to achieve satisfactory results. Since such impact strength-improving agents are rather expensive as compared with polyvinyl chloride and required to be used in large quantities, these known methods are unsatisfactory from the economical viewpoint. Further, in many cases the improvement in the impact strength is achieved at the cost of transparency of the product which is one of favorable properties of polyvinyl chloride. Conversely, attempts to retain the high transparency of polyvinyl chloride result in insufficiency of the improvement in impact strength.

Accordingly, an object of this invention is to provide a vinyl chloride polymer composition having a sufficiently improved impact strength with advantageous properties inherent to polyvinyl chloride being fully retained.

Another object of the invention is to provide a vinyl chloride polymer composition having a sufficiently improved impact strength by grafting only a small amount of an impact strength-improving agent.

Still another object of the invention is to provide a vinyl chloride graft polymer having an excellent impact strength without impairing the transparency inherently possessed by polyvinyl chloride.

A still further object of the invention is to provide a vinyl chloride graft polymer having a low brittle point temperature.

Other objects and advantages of the invention will be apparent from the description given hereinbelow.

This invention will now be detailed.

As a result of our research, we have found that the above objects and various advantages can be attained by a process comprising (a) dissolving an oil-soluble polyalkylene oxide having an intrinsic viscosity $[\eta]$, measured in benzene at 35°C., of from 1.3 to 4.5 and selected from the group consisting of polypropylene oxide, poly-1-butene oxide, a copolymer of propylene oxide and 1-butene oxide and a copolymer of an alkylene oxide selected from propylene oxide and 1-butene oxide with epichlorohydrin, in a monomeric mixture consisting of 99.5 – 90 parts of a vinyl chloride monomer and 0.5 – 10 parts of a comonomer selected from the group consisting of ethylene, propylene, 1-butene and iso-butene compounds, the amount of said oil-soluble polyalkylene oxide being 0.5 – 5 percent by weight based on the monomeric mixture, (b) emulsifying or suspending the resulting solution in water, (c) polymerizing the emulsified or suspended solution at a temperature of 30° – 80°C. in the presence of 0.01 – 5 percent by weight, based on the monomeric mixture, of a radical polymerization catalyst, and (d) recovering the resulting polymer.

According to this invention, at first (i) an oil-soluble polyalkylene oxide selected from the group consisting of polypropylene oxide, poly-1-butene oxide, a copolymer of propylene oxide and 1-butene oxide and a copolymer of an alkylene oxide selected from propylene oxide and 1-butene oxide with epichlorohydrin (which will be referred to as "oil-soluble polyalkylene oxide" hereinbelow) is dissolved in (ii) a monomeric mixture consisting of 99.5 – 90 parts of a vinyl chloride monomer and 0.5 – 10 parts of a comonomer selected from the group consisting of ethylene, propylene, 1-butene and iso-butene compounds, the amount of said oil-soluble polyalkylene oxide (i) being 0.5 – 5 percent by weight based on said monomeric mixture (ii).

Thus, in this invention it is essential to dissolve the oil-soluble polyalkylene oxide in the monomeric mixture comprising a vinyl chloride monomer and an α-olefin monomer in advance of the polymerization of the monomeric mixture. That is, the polyalkylene oxide to be used in the invention must be soluble in the monomeric mixture comprising a vinyl chloride monomer and an α-olefin monomer. Generally speaking, polyalkylene oxides are in the form of amorphous polymers having a crystallinity not exceeding 20 percent, except those which are insoluble in a vinyl chloride monomer, such as polyethylene oxide and polyisobutylene oxide. The former polymer is soluble in water and the latter polymer is crystalline. Since the increase of the crystallinity in polyalkylene oxides tends to impair the transparency of the vinyl chloride graft polymer of the invention, optimum results are normally obtained by the use of an amorphous oil-soluble polyalkylene oxide containing substantially no crystalline portion.

The oil-soluble polyalkylene oxide to be used in this invention has an intrinsic viscosity [η], measured in benzene at 35°C., of from 1.3 to 4.5. When the molecular weight of the oil-soluble polyalkylene oxide is excessively high, the viscosity of a solution formed by dissolving the polymer in the monomeric mixture containing a vinyl chloride monomer tends to rise noticeably, which is disadvantageous for the subsequent operation of polymerizing the monomeric mixture. In contrast, if the molecular weight is too low, a sufficient degree of improvement in the impact strength of the resulting vinyl chloride graft polymer composition cannot be achieved, and furthermore other physical properties of the graft polymer composition tend to be lowered.

As will be detailed hereinbelow, there is an important relation between the intrinsic viscosity [η] of the oil-soluble polyalkylene oxide and the impact strength of the resulting vinyl chloride polymer composition. In order for the oil-soluble polyalkylene oxide to be readily soluble in said vinyl chloride monomer-containing monomeric mixture while giving a solution excellent in workability and to impart a highly improved impact strength to the resulting polymer composition, the oil-soluble polyalkylene oxide should have an intrinsic viscosity, measured in benzene at 35°C., of from 1.3 to 4.5, preferably 1.5 to 4.0.

The oil-soluble polyalkylene oxide is dissolved in the vinyl chloride monomer-containing monomeric mixture in an amount of 0.5 to 5 percent by weight, preferably 1.0 to 3.5 percent by weight, based on the monomeric mixture. When the oil-soluble polyalkylene oxide is added in an amount smaller than the lower limit of the above range, the resulting vinyl chloride polymer composition exhibits still an insufficient impact strength. On the other hand, in case the amount of the oil-soluble polyalkylene oxide exceeds the upper limit, physical properties other than the impact strength of the resulting polymer composition, for example, tensile strength transparency are degraded, though a satisfactory improvement in the impact strength may be achieved.

The manner of the preparation of the above-mentioned oil-soluble polyalkylene oxide is not critical, but products of polymerization or copolymerization of the above-mentioned alkylene oxide monomer or monomers are generally used. For example, polymers or copolymers formed by ring-opening polymerization of the alkylene oxide monomer or monomers can be used as they are. Further, mastication products of high molecular weight polyalkylene oxides formed by using such means as roll milling, or polycondensation products of corresponding polyalkylene glycols may be used.

The oil-soluble polyalkylene oxide is dissolved in the monomeric mixture (ii) consisting of:

iii. 99.5 – 90 parts by weight, preferably 98 – 91 parts by weight of a vinyl chloride monomer, and iv. 0.5 – 10 parts by weight, preferably 2 – 9 parts by weight, of a comonomer selected from the group consisting of ethylene, propylene, 1-butene and iso-butene compounds.

The reason why the oil-soluble polyalkylene oxide is dissolved in such monomeric mixture is that a polymer composition obtained by dissolving the oil-soluble polyalkylene oxide (i) into the monomeric mixture (ii) consisting of 99.5 – 90 parts of the vinyl chloride monomer (iii) and 0.5 – 10 parts of the α-olefin comonomer (iv) and graft polymerizing the monomeric mixture (ii) to the oil-soluble polyalkylene oxide (i) is superior in the impact strength, transparency and workability to a polymer composition obtained by dissolving the oil-soluble polyalkylene oxide (i) into a vinyl chloride monomer and polymerizing vinyl chloride thereto.

As a result of our research it has been found that the amount of the α-olefin comonomer contained in said monomeric mixture is closely concerned with the physical properties of the polymer composition obtained by graft polymerization. More specifically, when the α-olefin comonomer is added to the vinyl chloride comonomer in a smaller amount, for instance, 0.5 percent by weight, preferably 2 percent by weight, based on the monomeric mixture, the impact strength of the resulting polymer composition increases abruptly, and at the same time the tensile strength, transparency and workability thereof are improved. Such improvement in the physical properties is conspicuous when the α-olefin is incorporated in an amount of 5 – 6 percent by weight based on the monomeric mixture. However, at a greater proportion of the α-olefin in the monomeric mixture, either the impact strength or tensile strength tends to be lowered, and when the proportion of the α-olefin exceeds 9 percent by weight, especially 10 percent by weight, the impact strength of the polymer composition decreases considerably and the tensile strength is lowered as well.

In view of the foregoing, in accordance with this invention, the oil-soluble polyalkylene oxide is dissolved into a monomeric mixture consisting of 99.5 – 90 parts by weight, preferably 98 – 91 parts by weight, of a vinyl monomer and 0.5 – 10 parts by weight, preferably 2 – 9 parts by weight, of the above-mentioned α-olefin comonomer, and the said monomeric mixture is then graft-polymerized.

In case ethylene or propylene is used as said comonomer, since such comonomer is ordinary in the gas form, it is operationally difficult or impossible to prepare in advance a mixture of such comonomer with vinyl chloride which is in the liquid state at room temperature and atmospheric pressure. In such case, the oil--soluble polyalkylene oxide is dissolved in the vinyl chloride monomer, and when the suspension or emulsion polymerization of the resulting solution is conducted under conditions described below, such normally gaseous comonomer as ethylene or propylene is fed continuously or at a time to the polymerization vessel (polymerization system) and it is polymerized together with the vinyl chloride monomer. Even such feature is included in the monomeric mixture of the vinyl chloride monomer and comonomer of the present invention. The reason is that the α-olefin comonomer fed in the above manner is readily mixed with the vinyl chloride monomer in the polymerization system, and the polymerization intended in this invention advances in the state that the oil-soluble polyalkylene oxide is dissolved in the resulting mixture of the vinyl chloride monomer and α-olefin comonomer.

The manner of polymerizing the monomeric mixture (ii) containing an oil-soluble polyalkylene oxide as dissolved therein is not particularly critical, and any of known emulsion and suspension polymerization techniques employing a radical initiator may be adopted. Further, known techniques of controlling the ratios of components to be copolymerized, the distribution of the molecular fraction of the product polymer and the molecular weight of the product, etc. may be optionally adopted during the polymerization. For example, in the emulsion polymerization 0.01 – 5 percent by weight, based on the monomeric mixture, of a water-soluble radical catalyst such as persulfates e.g., potassium persulfate and ammonium persulfate, hydrogen peroxide and the like may be made present together with an emulsifier such as known cationic, anionic and nonionic surface active agents, in the aqueous polymerization system comprising the monomeric mixture. The suspension polymerization may be practised in an aqueous polymerization system in the presence of 0.01 – 5 percent by weight, based on the monomeric mixture, of an oil-soluble radical catalyst, for example, peroxides such as lauroyl peroxide and benzoyl peroxide, azo compounds such as azobisisobutyronitrile, and diisopropyl peroxycarbonate and tert.-butyl perpivarate, and also in the presence of an appropriate amount of a suspension polymerization stabilizer such as methyl cellulose, hydroxyalkyl cellulose, polyvinyl alcohol, and polyvinyl pyrrolidone. Suitable temperatures for these polymerization operations differ depending on types of $\alpha$-olefin comonomers to be used, but generally, the polymerization is conducted at temperatures ranging from 30° to 80°C., preferably 40° to 70°C.

Furthermore, the suspension or emulsion polymerization techniques disclosed, for example, in Chemical Engineering, 74 (10), pp 151 – 158 (1967), ibid, 74 (14), pp 85 – 92 (1967), etc., may be applied to the polymerization of the monomeric mixture.

It is possible to blend the resulting vinyl chloride polymer composition of the invention with any of known impact strength-improving agents, such as an acrylonitrile/butadiene/styrene copolymer, a methyl methacrylate/butadiene/styrene copolymer, and an acrylonitrile/methyl methacrylate/butadiene/styrene copolymer. For instance, a polymer composition having an excellent impact strength while retaining a favorable transparency can be obtained by blending 1–10 parts of such impact strength-improving agent into 99 – 90 parts of the vinyl chloride polymer composition of the invention.

The vinyl chloride polymer composition obtained in accordance with the present invention has a prominently high impact strength. Furthermore, the impact strength can be advantageously maintained at a satisfactorily high level even under low temperature conditions. Also in the vinyl chloride polymer composition of this invention, favorable properties inherent to polyvinyl chloride such as transparency and other physical properties, are not impared. In fact, it is apparent from experimental results shown in Examples given below that the vinyl chloride polymer composition of the invention is entirely different from a simple mixture of a vinyl chloride polymer with an oil-soluble polyalkylene oxide. That is, the composition of the invention exhibits a highly improved impact strength over such simple mixture. Accordingly, the vinyl chloride polymer composition of the invention can be advantageously used in many fields where full utilization of polyvinyl chloride resins has been prevented because of their insufficient impact strength.

The present invention will now be detailed by referring to Examples and Comparative Examples, but the scope of the invention is in no way limited by these Examples. Values of the physical properties given in the Examples are those measured as to sheets formed under blending and shaping conditions specified in Tables A and B given below, through roll milling and pressing steps. The transparency, the degree of polymerization, and the impact strength were determined in the manners described below unless otherwise specified. Percentile ratios and parts are on the weight basis unless otherwise specified.

Blending and sheet-forming conditions:
(i) Recipe for hard and transparent product

TABLE A

| | |
|---|---|
| Vinyl chloride polymer composition to be tested | 100 parts |
| Dibutyltin maleate | 2 parts |
| Dibutyltin laurate | 2 parts |
| Di-tert.-butyl-p-cresol | 0.2 part |
| Rolling conditions: | milling at 155°C. for 10 minutes |
| Pressing conditions: | pressing at 175°C. under 70 kg/cm² for 16 minutes |

(ii) Recipe for modified, hard and transparent product

TABLE B

| | |
|---|---|
| Vinyl chloride polymer composition to be tested | 100 parts |
| Dioctyltin maleate | 3 parts |
| Dibutyltin maleate | 1.5 parts |
| BISUAMIDE* | 0.3 part |
| KASUTA wax** | 0.3 part |
| Rolling conditions: | milling at 160°C. for 10 minutes |
| Pressing conditions: | pressing at 175°C. under 70 kg/cm² for 16 minutes |

* commercially available bis-amide of fatty acid manufactured by Nippon Suiso Kogyo K.K.
** commercially available polyhydric alcohol ester of fatty acid produced by Nippon Yushi K. K.

Measurement of transparency:

The percent transmission of light of 550 m$\mu$ in wave length through the test piece of 1 mm in thickness was measured with a double-beam spectrophotometer, based on the percent transmission of the light through air as 100. The percent transmission of the light may be referred to simply as "percent transmission" hereinafter.

Measurement of degree of polymerization:

The measurement is conducted according to the method of JIS K 6721. When the solution viscosity of the polyalkylene oxide is greater than that of the polyvinyl chloride, the apparent degree of polymerization is very high. Accordingly, in the Examples the property is indicated as the apparent degree of polymerization.

Measurement of intrinsic viscosity:

The sample is dissolved in benzene, and values of the relative viscosity ($\eta$ rel) at various concentrations are measured at 35°C. The intrinsic viscosity [$\eta$] (lim $\eta$ c→0 rel/c) was calculated by extrapolating the value of ($\eta$ rel) to zero.

Measurement of impact strength:

A sample sheet of 0.55 ± 0.03 mm in thickness and 12 mm × 12 mm in size was subjected to Du Pont impact tester (impact needle size = ¼ inch) at 25 ± 0.3°C. At each level of potential energy of a falling hammer, 20 sheets of the sample are given a shock, and their breaking ratios are plotted on a logarithmic normal distribution graph, to calculate the energy level at which 50 percent the test sheets are broken, said energy level being given as impact strength. The impact strength will be abbreviated as IS in the Examples.

Measurement of flow temperature:

The flow temperature of the sample composition is tested at a nozzle size of 1 mm in diameter and 2 mm in thickness and under a load of 80 kg/cm$^2$ with use of a KOKA flow tester, the temperature-raising rate being 3°C./min. The flow temperature was defined as a temperature at which the composition flows at a rate of 2 × 10$^{-3}$ cc/sec. under the above-mentioned conditions. The flow temperature will be abbreviated as Tf in the Examples.

Measurement of tensile strength:

The tensile strength is measured at 25° ± 0.5°C. in accordance with JIS K 6745. The tensile strength will be abbreviates as TS in the Examples.

Confirmation of vinyl chloride graft polymers:

The vinyl chloride polymer composition obtained in the present invention is roll-kneaded according to the recipe of a hard and transparent product, and then it is press-molded. The so formed sheet is fractionated by the following procedure and the confirmation is effected by the elementary analysis.

Fraction 1:
The sheet is dissolved in 30 g of tetrahydrofuran capable of dissolving both the polyvinyl chloride and polyalkylene oxide. The precipitate formed by addition of 350 cc of benzene under stirring is separated and dried under reduced pressure.

Fraction 2:
The remaining mother liquor is concentrated until its amount is reduced to 60 cc. The resulting precipitate is separated and dried under reduced pressure.

Fraction 3:
The remaining mother liquor is dried under reduced pressure.

Fraction 3 should naturally consist of the polyalkylene oxide, the copolymer of vinyl chloride with an α-olefin comonomer having a low molecular weight, and the stabilizer and lubricant added at the time of making the sheet, which have been all readily soluble in benzene. If the obtained vinyl chloride polymer composition is grafted, the polyalkylene oxide is coprecipitated in any of the above fractions in equal ratios according to the molecular weight of the grafted copolymer of vinyl chloride and the α-olefin comonomer. Hence, the elementary analysis of each of the Fractions shows that the Cl content of each fraction is almost equal to one another. It can be confirmed that the polyalkylene oxide is grafted, since it is not isolated by the fractional precipitation.

On the other hand, when the copolymer of vinyl chloride and the α-olefin comonomer is merely blended with the polyalkylene oxide, a major portion of the polyalkylene oxide is isolated in Fraction 3, and therefore, Fraction 3 has a very low Cl content.

By the above-mentioned method, it is confirmed that in the vinyl chloride polymer composition obtained in accordance with this invention the copolymer of vinyl chloride and the α-olefin comonomer is grafted to the oil-soluble polyalkylene oxide.

The abbreviations used in the Examples have the following meanings:
PAO : polyalkylene oxide
VCM : vinyl chloride monomer
LII : tert.-butyl perpivarate
LOP : lauroyl peroxide
AIBN : azobisisobutyronitrile
[$\eta$] : intrinsic viscosity of polyalkylene oxide
PPO : polypropylene oxide
PBO : polybutene-1,2-oxide
VA : vinyl acetate
PO : propylene oxide
BO : 1-butene oxide
ECH : epichlorohydrin
Pr : propylene
Et : ethylene
1-But : 1-butene
i-But : isobutene

EXAMPLE 1

A 5-liter capacity polymerization vessel equipped with a stirrer was charged with polypropylene oxide in an amount indicated in Table 1 together with 200 parts of pure water, 0.01 part of "Liponox NCA" (commercial polyoxyethylene nonyl phenyl ether manufactured by Lion Yushi K.K.) and with "Methocell 90 SH 100" (commercial methyl cellulose manufactured by The Dow Chemical Co., which will be abbreviated as "MS" hereinbelow) in an amount of 0.05 part in Run No. 1, 0.07 part in Run No. 2 or 0.10 part in Runs Nos. 3 through 10. The inside atmosphere of the vessel was replaced by nitrogen, and the inside pressure of the vessel was reduced to 60 mm Hg with a vacuum pump, into which vinyl chloride and propylene were fed in amounts indicated in Table 1, followed by 8 hours' stirring at 40°C. to dissolve the polypropylene oxide in the monomeric mixture of vinyl chloride and propylene. Then a catalyst indicated in Table 1 was added to the vessel, and polymerization was performed at a temperature indicated in Table 1 and for a period also indicated in Table 1. Unreacted monomeric components were purged, and the slurry withdrawn was filtered and dried to obtain a vinyl chloride graft polymer as a white powder. The yield obtained in each Run is shown in Table 1. The resulting powder was blended in accordance with the recipe for the modified, hard and transparent product shown in Table B above, roll-milled and pressed into a sheet. The test results of the sheets are given in Table 1, and values of the impact strength in Runs Nos. 5 to 10 are plotted in curve b of FIG. 1.

In case the amount of VCM is indicated doubly (for example, Run No. 2 in Table 1), the upper amount is one caused to be initially present in the polymerization system and the lower amount is one supplied to the polymerization vessel at a rate of seven parts per hour by means of a plunger pump during the polymerization.

TABLE 1

| Run Number | 1 | 2 | 3 | 4 | 5 | 6 | 7 | 8 | 9 | 10 |
|---|---|---|---|---|---|---|---|---|---|---|
| PAO: | | | | | | | | | | |
| Type | PPO | PPO | PPO | PPO | PPO | PPO | PPO | PPO | PPO | PPO |
| $[\eta]$ (dl./gr.) | 2.1 | 2.1 | 2.1 | 2.1 | 0.5 | 1.6 | 2.1 | 3.0 | 4.0 | 5.0 |
| Amount (parts) | 1.0 | 2.0 | 3.0 | 3.6 | 2.0 | 2.0 | 2.0 | 2.0 | 2.0 | 2.0 |
| VCM: Amount (parts) | 94.5 | { 66.0 / 28.5 } | 94.5 | 94.5 | 95.0 | 95.0 | 95.0 | 95.0 | 95.0 | 95.0 |
| Comonomer: | | | | | | | | | | |
| Type | Pr | Pr | Pr | Pr | Pr | Pr | Pr | Pr | Pr | Pr |
| Amount (parts) | 5.5 | 5.5 | 5.5 | 5.5 | 5.0 | 5.0 | 5.0 | 5.0 | 5.0 | 5.0 |
| Catalyst: | | | | | | | | | | |
| Type | LII | LII | LII | LII | LII | LII | LII | LII | LII | LII |
| Amount (parts) | 0.12 | 0.12 | 0.12 | 0.12 | 0.12 | 0.12 | 0.12 | 0.12 | 0.12 | 0.12 |
| Polymerization: | | | | | | | | | | |
| Temperature (° C.) | 50 | 49.5 | 50 | 52 | 50 | 50 | 50 | 50 | 50 | 50 |
| Time (hr.: min.) | 22:00 | 22:00 | 22:00 | 22:00 | 20:00 | 20:00 | 20:00 | 20:00 | 20:00 | 20:00 |
| Yield (percent) | 81.8 | 78.4 | 78.7 | 85.4 | 78.5 | 80.4 | 79.2 | 83.1 | 80.4 | 81.2 |
| Apparent degree of polymerization | 892 | 900 | 986 | 903 | 786 | 844 | 820 | 892 | 923 | 992 |
| Properties of molded sheet: | | | | | | | | | | |
| TS (kg./mm.$^2$) | 5.6 | 5.4 | 5.0 | 4.9 | 5.3 | 5.4 | 5.4 | 5.3 | 5.3 | 5.4 |
| IS (kg.-cm.) | 9.0 | 32 | 40 | >40 | 6.2 | 18.5 | 32.0 | 33.1 | 31.5 | 30.4 |
| Percent transmission | 82.9 | 79.5 | 74.3 | 60.4 | 78.2 | 79.4 | 80.0 | 79.4 | 79.5 | 78.6 |
| Tf (° G.) | 167.8 | 166.5 | 165.1 | 162.6 | 165.2 | 165.8 | 166.4 | 166.9 | 168.1 | 169.5 |
| Gear oven stability (min.) | 125 | 130 | 130 | 105 | 130 | 125 | 130 | 130 | 125 | 125 |

COMPARATIVE EXAMPLE 1

For comparison, experiments of Example 1 were repeated without employing any polyalkylene oxide. The polymerization was conducted under conditions indicated in Table 2. Runs Nos. 2, 4 and 8 were performed similarly to Run No. 2 of Example 1. Results are shown in Table 2.

| | | | |
|---|---|---|---|
| copolymer of Run No. 1 of Comparative Example 1 | 2.5 | 2.0 | 1.9 |
| PVC (P=802) | 4.1 | 2.8 | 2.0 |

EXAMPLE 3

Run No. 1 of Example 1 was repeated by employing 2.0 parts of a propylene oxide/epichlorohydrin copolymer containing 4 mole percent of Table 2

| | Comonomer | | Catalyst | | Polymerization condition | | Results | | | | | |
|---|---|---|---|---|---|---|---|---|---|---|---|---|
| Run No. | Type | Amount (parts) | Type | Amount (part) | Temperature (° C.) | Time (hr.:min.) | Yield (percent) | Apparent degree of polymerization | IS (kg./cm.) | TS (kg./mm².) | Tf (° C.) | Percent transmission |
| 1 | Pr | 5.5 | LII | 0.12 | 50.0 | 22:00 | 82.3 | 710 | 4.1 | 5.9 | 165.5 | 82.4 |
| 2 | Pr | 5.5 | LII | 0.21 | 49.5 | 22:00 | 78.6 | 698 | 5.1 | 5.8 | 166.8 | 82.3 |
| 3 | Pr | 3.5 | LII | 0.12 | 56.0 | 18:00 | 83.2 | 817 | 5.5 | 6.1 | 171.2 | 82.8 |
| 4 | Pr | 6.5 | LII | 0.12 | 47.0 | 21:00 | 75.0 | 667 | 3.6 | 5.5 | 160.4 | 82.9 |
| 5 | VA | 5.0 | LII | 0.02 | 61.5 | 8:00 | 81.2 | 710 | 4.8 | 6.1 | 167.7 | 83.4 |
| 6 | VA | 10.0 | LII | 0.03 | 58.0 | 8:30 | 79.5 | 750 | 4.0 | 5.4 | 156.2 | 82.9 |
| 7 | Vinyl octyl ether | 4.0 | LII | 0.03 | 57.0 | 11:00 | 82.3 | 710 | 4.0 | 6.0 | 7.0 | 83.0 |
| 8 | i-But | 6.0 | LII | 0.14 | 50.0 | 19:00 | 78.5 | 706 | 4.5 | 5.9 | 166.5 | 82.6 |
| 9 | | | { LII / LPO } | { 0.045 / 0.15 } | 66.0 | 4:30 | 85.2 | 738 | 4.6 | 5.7 | 178.6 | 80.3 |
| 10 | | | { LII / LPO } | { 0.045 / 0.15 } | 63.0 | 6:10 | 83.1 | 830 | 5.6 | 5.6 | 180.2 | 80.6 |

EXAMPLE 2

The experiment of Run No. 3 of Example 1 (see Table 1) was repeated to synthesize a vinyl chloride graft polymer, by employing a polypropylene oxide having an intrinsic viscosity $[\eta]$ of 3.3. The resulting vinyl chloride graft polymer composition was blended in accordance with the recipe shown in Table B, roll-milled, pressed and laminated into a sheet of 12 mm in thickness, which was then formed into a sample to be subjected to the Izod impact test.

For comparison, the vinyl chloride/propylene copolymer obtained in Run No. 1 of Comparative Example 1 (see Table 2) and polyvinyl chloride having a degree of polymerization ($\bar{P}$) of 800 were separately formed into similar samples, and their Izod impact strength was determined. Results are shown in Table 3. The temperature at which the Izod impact strength was measured is indicated in Table 3. The determination of the Izod impact strength was conducted in accordance with ASTM D–256 in all cases.

TABLE 3

| | Temperature (°C.) | | |
|---|---|---|---|
| Sample | 25 | 0 | −20 |
| graft polymer composition obtained in Example 2 | 35 | >35 | 16 | epichlorohydrin and having an intrinsic viscosity $[\eta]$ of 2.3 instead of 1 part of the polypropylene oxide having an intrinsic viscosity $[\eta]$ of 2.1. The copolymer was dissolved in a monomeric mixture composed of 94.5 parts of vinyl chloride and 5.5 parts of propylene, and the polymerization was conducted at 53°C. for 19 hours. As a result, a vinyl chloride/propylene graft polymer having an apparent degree of polymerization of 806 was obtained in a yield of 86.5 percent. The graft polymer was formed into a sheet in a similar manner to that adopted in Example 1, and the resulting sheet was characterized by IS of 25.0 kg-cm, TS of 5.6 kg/mm², Tf of 163.5°C. and a percent transmission of 81.7 percent.

EXAMPLE 4

The experiment of Run No. 2 of Example 1 was repeated by employing a copolymer indicated in Table 4 instead of the polypropylene oxide used in Example 1. The amount of vinyl chloride added initially to the polymerization system corresponds to the amount (parts) obtained by subtracting the sum of the amount of vinyl chloride additionally fed during the polymerization and the amount of propylene from 100 parts. In each Run the polymerization temperature was changed as indicated in Table 4 during the polymerization.

TABLE 4

| Run No. PAO | 1 | 2 |
|---|---|---|
| Type | PO-BO | PO-BO |
| Mole % | 5 | 5 |
| [$\eta$] | 2.7 | 2.0 |
| Amount (parts) | 1.5 | 1.5 |
| | | |
| Comonomer | | |
| Type | Pr | Pr |
| Amount (parts) | 5.5 | 5.5 |
| Amount of Additionally Fed VCM (parts) | 30.2 | 35.0 |
| | | |
| Catalyst | | |
| Type | LII | LII |
| Amount (part) | 0.12 | 0.12 |
| | | |
| Polymerization Conditions | | |
| Temperature (°C.) | 49.0 | 49.0 |
| | 60.0 | 59.0 |
| Time (hr.) | 11 | 10 |
| | 5 | 5 |
| | | |
| Results | | |
| Yield (%) | 83.3 | 81.2 |
| Apparent degree of polymerization | 830 | 892 |
| IS (kg-cm) | 20.0 | 16.8 |
| TS (kg/mm$^2$) | 5.7 | 5.5 |
| Tf (°C.) | 165.0 | 166.2 |
| Percent transmission (%) | 82.1 | 82.1 |

EXAMPLE 5

The experiment of Run No. 2 of Example 1 was repeated by employing a copolymer of propylene oxide with 1,2-butene oxide or epichlorohydrin instead of the polypropylene oxide in Example 1 and varying the kind and amount of the α-olefin as indicated in Table 5. In Run No. 1 the temperature was changed during the polymerization as indicated in Table 5.

Figure 2:
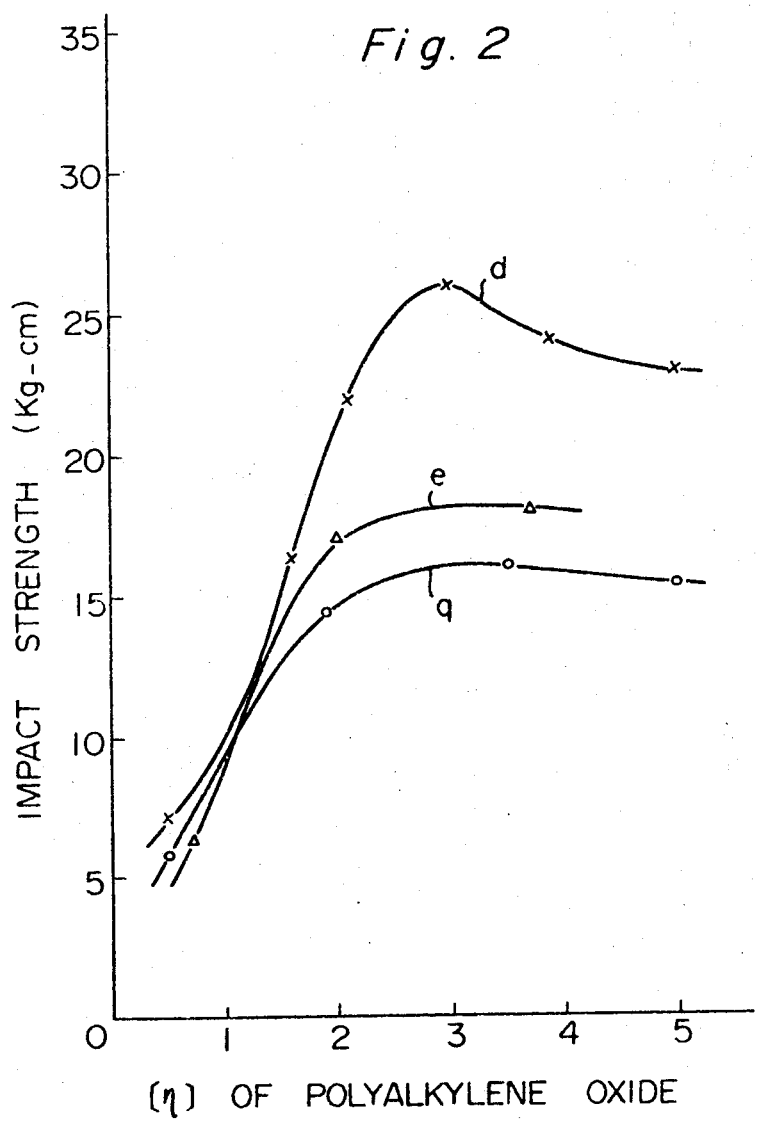

The results are shown in Table 5, and the values of the impact strength of samples of Runs Nos. 1 to 3 and 5 to 7 are shown in curve *e* in FIG. 2 and curve *f* in FIG. 3.

EXAMPLE 6

A 2-liter capacity autoclave equipped with a stirrer was charged with vinyl chloride and polypropylene oxide in amounts indicated in Table 6. The polypropylene oxide was dissolved in the vinyl chloride by conducting the agitation at room temperature for 4 hours.

Separately, a 5-liter capacity autoclave equipped with a stirrer was charged with 200 parts of pure water, 0.5 part of polyvinyl alcohol and a polymerization initiating catalyst in an amount indicated in Table 6. After the inside atmosphere had been replaced by nitrogen, the inside pressure of the autoclave was reduced to 20 mm Hg, into which the total of the solution prepared above was supplied. Then, ethylene in an amount indicated in Table 6 was charged into the autoclave. The reaction mixture was stirred and heated to a temperature indicated in Table 6 to accomplish the polymerization. After completion of the polymerization, unreacted monomers were purged, and the slurry was withdrawn, filtered and dried to obtain a vinyl chloride-ethylene graft polymer as a white powder. The powdery polymer was shaped into a sheet by adopting the recipe for the modified, hard and transparent product indicated in Table B, and the physical properties thereof were determined to obtain results shown in Table 6. The values of the impact strength of samples of Runs Nos. 1 to 6 were plotted to form curve *a* in FIG. 1.

In conducting Run No. 7 of this Example, there was adopted the same method as employed in Example 1, except that 0.07 part of MS was charged and the ethylene was fed after the addition of the catalyst, and that the polymerization was practised under purging of ethylene at a suitable rate to maintain the inside pressure of the autoclave at a level not higher than 20 kg/cm$^2$, because the inside pressure rose with the advance of the polymerization.

TABLE 5

| Run number | 1 | 2 | 3 | 4 | 5 | 6 | 7 | 8 | 9 |
|---|---|---|---|---|---|---|---|---|---|
| PAO: | | | | | | | | | |
| Type | PO-BO | PO-BO | PO-BO | PO-BO | PO-ECH | PO-ECH | PO-ECH | PO-ECH | PO-BO |
| | 95/5 | 95/5 | 95/5 | 70/30 | 96/4 | 96/4 | 90/4 | 90/10 | 95/5 |
| [$\eta$] (dl./gr.) | 0.7 | 2.0 | 3.7 | 2.0 | 0.5 | 2.3 | 3.7 | 2.1 | 2.0 |
| Amount (parts) | 1.5 | 1.5 | 1.5 | 2.0 | 1.0 | 1.0 | 1.0 | 2.0 | 1.5 |
| VCM (parts) | 94.5 | 94.5 | 94.5 | 94.0 | 66.0 | 66.0 | 66.0 | 94.5 | 59.5 |
| | | | | | 28.0 | 28.0 | 28.0 | | 35.0 |
| Comonomer: | | | | | | | | | |
| Type | Pr | Pr | Pr | 1-But | Pr | Pr | Pr | Pr | Pr |
| Amount (parts) | 5.5 | 5.5 | 5.5 | 6.0 | 6.0 | 6.0 | 6.0 | 5.5 | 5.5 |
| Catalyst: | | | | | | | | | |
| Type | LII | LII | LII | LII | LII | LII | LII | LII | LII |
| Amount (part) | 0.12 | 0.12 | 0.12 | 0.12 | 0.12 | 0.12 | 0.12 | 0.12 | 0.12 |
| Polymerization conditions: | | | | | | | | | |
| Temperature (° C.) | 49.0 | 49.0 | 49.0 | 50 | 49.5 | 49.5 | 49.5 | 52 | 49.0 |
| | 60.0 | 60.0 | 60.0 | | | | | | 59.0 |
| Time (hr.:min.) | 11:00 | 11:00 | 11:00 | 20:00 | 22:00 | 22:00 | 22:00 | 18:00 | 10:00 |
| | 5:00 | 5:00 | 5:00 | | | | | | 5:00 |
| Polymerization results: | | | | | | | | | |
| Yield (percent) | 83.3 | 82.0 | 84.5 | 77.6 | 78.3 | 81.5 | 76.6 | 77.1 | 81.2 |
| Apparent degree of polymerization | 830 | 906 | 912 | 820 | 930 | 892 | 955 | 865 | 892 |
| Properties of molded sheet: | | | | | | | | | |
| TS (kg./mm.$^2$) | 5.7 | 5.6 | 5.6 | 5.1 | 5.7 | 5.7 | 5.7 | 5.4 | 5.5 |
| IS (kg.-cm.) | 6.3 | 17.0 | 18.0 | 23.0 | 5.5 | 13.7 | 14.2 | 19.0 | 16.8 |
| Percent transmission | 80.6 | 82.1 | 80.7 | 78.1 | 82.5 | 83.1 | 82.0 | 82.3 | 82.1 |
| Tf (° C.) | 164.5 | 165.0 | 167.1 | 165.5 | 164.5 | 164.1 | 165.3 | 166.8 | 166.2 |
| Gear oven stability (min.) | 130 | 125 | 130 | 120 | 130 | 130 | 135 | 120 | 125 |

TABLE 6

| Run Number | 1 | 2 | 3 | 4 | 5 | 6 | 7 |
|---|---|---|---|---|---|---|---|
| PAO: | | | | | | | |
| Type | PPO | PPO | PPO | PPO | PPO | PPO | PPO |
| $[\eta]$ (dl./gr.) | 0.5 | 1.6 | 2.1 | 3.0 | 3.9 | 5.0 | 2.1 |
| Amount (parts) | 2.0 | 2.0 | 2.0 | 2.0 | 2.0 | 2.0 | 2.0 |
| VCM: Amount (parts) | 98.2 | 98.2 | 98.2 | 98.2 | 98.2 | 98.2 | 90.0 |
| Comonomer: | | | | | | | |
| Type | Et | Et | Et | Et | Et | Et | Et |
| Amount (parts) | 1.8 | 1.8 | 1.8 | 1.8 | 1.8 | 1.8 | 10.0 |
| Catalyst: | | | | | | | |
| Type | LII / LPO | LII / LPO | LII / LPO | LII / LPO | LII / LPO | LII / LPO | LII |
| Amount (part) | 0.06 / 0.04 | 0.06 / 0.04 | 0.06 / 0.04 | 0.06 / 0.04 | 0.06 / 0.04 | 0.06 / 0.04 | 0.12 |
| Polymerization conditions: | | | | | | | |
| Temperature (°C.) | 54 | 54 | 54 | 54 | 54 | 54 | 49.5 |
| Time (hr.:min.) | 10:00 | 10:00 | 10:00 | 10:00 | 10:00 | 10:00 | 18:00 |
| Polymerization results: | | | | | | | |
| Yield (percent) | 81.2 | 78.7 | 80.5 | 78.5 | 77.3 | 78.6 | |
| Apparent degree of polymerization | 1,274 | 1,331 | 1,325 | 1,329 | 1,340 | 1,372 | 875 |
| Properties of molded sheet: | | | | | | | |
| TS (kg./mm.²) | 5.3 | 5.5 | 5.4 | 5.5 | 5.4 | 5.5 | 5.1 |
| IS (kg.-cm.) | 9.5 | 19 | 34 | 36 | 36 | 33 | 24 |
| Percent transmission | 69.3 | 66.2 | 68.4 | 67.5 | 67.7 | 66.5 | 82.1 |
| Tf (°C.) | 172.1 | 173.3 | 174.6 | 174.2 | 175.5 | 176.9 | 134.2 |
| Gear oven stability (min.) | 130 | 125 | 130 | 130 | 125 | 130 | 125 |

EXAMPLE 7

The polymerization of mixtures of vinyl chloride and isobutene was carried out in the presence of polypropylene oxide in the same manner as in Example 1 except that MS was used in an amount of 0.1 part in Runs Nos. 1 through 6 and 0.07 part in Run No. 7.

Results are shown in Table 7, and the values of the impact strength of samples of Runs Nos. 1 through 6 were plotted to form curve $d$ in FIG. 2.

polyoxyethylene stearate. The resulting emulsion was salted out by addition of saturated saline water, followed by filtration and drying. Thus there was obtained a graft copolymer having an apparent degree of polymerization of 1023 in a yield of 82.1 percent. The copolymer was shaped into a sheet in the same manner as in Example 1, and the properties of the sheet were determined to obtain the following results a percent transmission of 69.5 percent, IS of 31 kg-cm and TS of 4.5 kg/mm².

TABLE 7

| Run number | 1 | 2 | 3 | 4 | 5 | 6 | 7 |
|---|---|---|---|---|---|---|---|
| PAO: | | | | | | | |
| Type | PPO | PPO | PPO | PPO | PPO | PPO | PPO |
| $[\eta]$ (dl./gr.) | 0.5 | 1.6 | 2.1 | 3.0 | 3.9 | 5.0 | 2.1 |
| Amount (parts) | 1.5 | 1.5 | 1.5 | 1.5 | 1.5 | 1.5 | 2.0 |
| VCM: Amount (parts) | 94.0 | 94.0 | 94.0 | 94.0 | 94.0 | 94.0 | 64.2 / 29.8 |
| Comonomer: | | | | | | | |
| Type | i-But | i-But | i-But | i-But | i-But | i-But | i-But |
| Amount (parts) | 6.0 | 6.0 | 6.0 | 6.0 | 6.0 | 6.0 | 6.0 |
| Catalyst: | | | | | | | |
| Type | LII | LII | LII | LII | LII | LII | LII |
| Amount (part) | 0.15 | 0.15 | 0.15 | 0.15 | 0.15 | 0.15 | 0.15 |
| Polymerization conditions: | | | | | | | |
| Temperature (°C.) | 48 | 48 | 48 | 48 | 48 | 48 | 47.5 |
| Time (hr.:min.) | 20:00 | 20:00 | 20:00 | 20:00 | 20:00 | 20:00 | 22:00 |
| Polymerization results: | | | | | | | |
| Yield (percent) | 79.3 | 80.2 | 78.4 | 78.6 | 79.5 | 77.3 | 78.2 |
| Apparent degree of polymerization | 820 | 893 | 916 | 904 | 916 | 930 | 864 |
| Properties of molded sheet: | | | | | | | |
| TS (kg./mm.²) | 5.4 | 5.5 | 5.6 | 5.5 | 5.7 | 5.6 | 5.6 |
| IS (kg.-cm.) | 7.1 | 16.3 | 22 | 26 | 24 | 23 | 21 |
| Percent transmission | 80.2 | 79.1 | 79.5 | 78.6 | 78.1 | 78.6 | 81.0 |
| Tf (°C.) | 167.3 | 168.5 | 167.9 | 168.3 | 168.7 | 169.0 | 166.8 |
| Gear oven stability (min.) | 125 | 130 | 130 | 125 | 130 | 125 | 130 |

EXAMPLE 8

Run No. 2 of Example 1 was repeated with use of 1.5 parts of poly-1-butene oxide having an intrinsic viscosity $[\eta]$ of 1.7 as the oil-soluble polyalkylene oxide. The polymerization was conducted at 53°C. for 14 hours by initially charging 69.0 parts of VCM and 5.5 parts of propylene and feeding 25.0 parts of VCM during the polymerization. Thus there was obtained a graft polymer having an apparent degree of polymerization of 815 in a yield of 76.5 percent. The properties of a sheet shaped from this polymer in the same manner as in Example 1 were as follows: IS of 15.1 kg-cm, TS of 5.1 kg/mm², Tf of 162.8°C. and a percent transmission of 81.3%.

EXAMPLE 9

The emulsion polymerization was conducted in the same manner as in Run No. 3 of Example 1 except that MS and Liponoy NCA were replaced by 5.0 parts of

EXAMPLE 10

The polymerization of mixtures of vinyl chloride and 1-butene in the presence of polypropylene oxide was repeated in the same manner as in Runs Nos. 5 to 10 of Example 1, except that 0.5 part of polyvinyl alcohol was used instead of MS and Liponox NCA and the polymerization conditions were modified as shown in Table 8.

Physical properties of sample sheets shaped from the resulting polymers are shown in Table 8, and the values of the impact strength were plotted to obtain curve $c$ in FIG. 1.

COMPARATIVE EXAMPLE 2

Run No. 7 of Example 1 was repeated by using a vinyl monomer indicated in Table 9 instead of propylene and conducting the polymerization under conditions shown in Table 9. Results are also shown in Table 9.

TABLE 8

| Run number | 1 | 2 | 3 | 4 | 5 | 6 |
|---|---|---|---|---|---|---|
| PAO: | | | | | | |
| Type | PPO | PPO | PPO | PPO | PPO | PPO |
| [$\eta$] (dl./gr.) | 0.5 | 1.6 | 2.1 | 3.0 | 4.0 | 5.0 |
| Amount (parts) | 2.0 | 2.0 | 2.0 | 2.0 | 2.0 | 2.0 |
| VCM: Amount (parts) | 96.0 | 96.0 | 96.0 | 96.0 | 96.0 | 96.0 |
| Comonomer: | | | | | | |
| Type | i-But | i-But | i-But | i-But | i-But | i-But |
| Amount (parts) | 4.0 | 4.0 | 4.0 | 4.0 | 4.0 | 4.0 |
| Catalyst: | | | | | | |
| Type | LII | LII | LII | LII | LII | LII |
| Amount (parts) | 0.12 | 0.12 | 0.12 | 0.12 | 0.12 | 0.12 |
| Polymerization conditions: | | | | | | |
| Temperature (°C.) | 54 | 54 | 54 | 54 | 54 | 54 |
| Time (hr.:min.) | 16:00 | 16:00 | 16:00 | 16:00 | 16:00 | 16:00 |
| Polymerization results: | | | | | | |
| Yield (percent) | 84.5 | 82.1 | 85.5 | 84.0 | 80.4 | 87.0 |
| Apparent degree of polymerization | 896 | 910 | 908 | 953 | 929 | 981 |
| Properties of molded sheet: | | | | | | |
| TS (kg./mm.²) | 5.0 | 5.2 | 5.3 | 5.1 | 5.2 | 5.2 |
| IS (kg.-cm.) | 7.9 | 13.0 | 27 | 31 | 29 | 28 |
| Percent transmission | 80.4 | 80.5 | 81.3 | 80.9 | 79.2 | 78.6 |
| Tf (°C.) | 164.2 | 165.3 | 164.7 | 165.6 | 166.3 | 167.0 |
| Gear oven stability (min.) | 120 | 125 | 125 | 120 | 125 | 120 |

TABLE 9

| Run No. | 1 | 2 | 3 | 4 |
|---|---|---|---|---|
| PAO | | | | |
| Type | PPO | PPO | PPO | PPO |
| [$\eta$] (dl/gr) | 2.1 | 2.1 | 2.1 | 2.1 |
| Amount (parts) | 2.0 | 2.0 | 2.0 | 2.0 |
| VCM | | | | |
| Amount (parts) | 94.0 | 96.0 | 97.0 | 95.0 |
| Comonomer | | | | |
| Type | MMA | BuAc* | BuMal** | VA |
| Amount (parts) | 6.0 | 4.0 | 3.0 | 5.0 |
| Catalyst | | | | |
| Type | LII | LII | LII | LII |
| Amount (part) | 0.03 | 0.03 | 0.06 | 0.03 |
| Polymerization Conditions | | | | |
| Temperature (°C.) | 64.5 | 64.5 | 57.0 | 61.5 |
| Time (hr:min) | 8:30 | 9:00 | 10:00 | 8:00 |
| Polymerization Results | | | | |
| Yield (%) | 85.1 | 84.3 | 79.2 | 84.0 |
| Apparent degree of polymerization | 970 | 882 | 864 | 1034 |
| Properties of Molded Sheet | | | | |
| TS (kg/mmh²) | 5.2 | 4.8 | 5.5 | 5.3 |
| IS (kg-cm) | 11.4 | 15.2 | 17.1 | 10.3 |
| Percent transmission (%) | 83.0 | 82.4 | 76.5 | 83.4 |
| Tf (°C.) | | | 166.3 | 167.5 |
| Gear over stability (min) | 40 | 55 | 50 | 30 |

*: n-butyl acrylate
**: dibutyl maleate

COMPARATIVE EXAMPLE 3

Sheets were prepared by mechanically blending polyvinyl chloride and polypropylene oxide by roll-milling in accordance with the recipe for the modified, hard and transparent product shown in Table A above.

Properties of the polymers used and results of tests of the sheets are shown in Table 10.

TABLE 10

| Run No. | 1 | 2 | 3 |
|---|---|---|---|
| PVC | | | |
| $\bar{P}$ | 730 | 730 | 710* |
| Amount (parts) | 100 | 100 | 100 |
| PAO | | | |
| Type | PPO | PPO | PPO |
| [$\eta$] (dl/gr) | 2.1 | 2.9 | 2.1 |
| Amount (parts) | 2.0 | 3.0 | 2.0 |
| Physical Properties of Molded Sheet | | | |
| TS (kg/mm²) | 5.3 | 4.7 | 5.1 |
| IS (kg-cm) | 4.2 | 17.0 | 6.5 |
| Percent transmission (%) | 52.0 | 18.9 | 50.5 |
| Gear oven stability (min) | 40 | 30 | 40 |

*: VCM-Pr copolymer obtained in Run No. 1 of Table 1.

COMPARATIVE EXAMPLE 4

A 5-liter inner capacity polymerization vessel equipped with a stirrer was charged with amounts indicated in Table 11 of pure water, MS, Liponox NCA and polypropylene oxide. The inside atmosphere of the polymerization vessel was replaced by nitrogen and then a vinyl chloride monomer in an amount indicated in Table 11 was introduced into the polymerization vessel. The stirring was conducted at 40°C. for 8 hours to dissolve polypropylene oxide into VCM. The intrinsic viscosity [$\eta$] of the polypropylene oxide used is shown in Table 11.

After completion of the polymerization, the unreacted monomers were purged, and the polymer slurry was withdrawn, filtered and dried to obtain a white powder of a vinyl chloride graft polymer. The powder was blended in accordance with the recipe shown in Table B, and the modified, hard and transparent product was roll-milled and pressed into a sheet under conditions indicated in Table B, which was then subjected to the impact test. Results are shown in Table 12, and were plotted to obtain curves p, q and r in FIGS. 1 to 3, respectively.

TABLE 11

| Run number | Pure water (parts) | VCM (parts) | PPO [$\eta$] dl./gr. | PPO Parts | MS (parts) | Liponox NCA (part) | Impact strength (kg.-cm.) |
|---|---|---|---|---|---|---|---|
| 1 | 200 | 94.5 | 0.5 | 2.0 | 0.10 | 0.02 | 6.8 |
| 2 | 200 | 94.5 | 1.6 | 2.0 | 0.10 | 0.02 | 11.6 |
| 3 | 200 | 94.5 | 2.1 | 2.0 | 0.10 | 0.02 | 17.0 |
| 4 | 200 | 94.5 | 3.0 | 2.0 | 0.10 | 0.02 | 19.3 |
| 5 | 200 | 94.5 | 4.0 | 2.0 | 0.10 | 0.02 | 21.4 |
| 6 | 200 | 94.5 | 5.0 | 2.0 | 0.10 | 0.02 | 21.5 |
| 7 | 200 | 94.5 | 0.5 | 1.5 | 0.10 | 0.02 | 5.9 |
| 8 | 200 | 94.5 | 1.9 | 1.5 | 0.10 | 0.02 | 14.4 |
| 9 | 200 | 94.5 | 3.5 | 1.5 | 0.10 | 0.02 | 16.0 |
| 10 | 200 | 94.5 | 5.0 | 1.5 | 0.10 | 0.02 | 15.3 |
| 11 | 200 | 94.5 | 0.5 | 1.0 | 0.10 | 0.02 | 5.2 |
| 12 | 200 | 94.5 | 2.1 | 1.0 | 0.10 | 0.02 | 9.8 |
| 13 | 200 | 94.5 | 3.5 | 1.0 | 0.10 | 0.02 | 11.1 |
| 14 | 200 | 94.5 | 4.5 | 1.0 | 0.10 | 0.02 | 10.0 |

EXAMPLE 11

The influences of the molar ratio of propylene to VCM were investigated by employing the same operational procedure as adopted in Example 1. The runs were conducted with use of 0.5 part of polyvinyl alcohol instead of Liponox NCA and MS. Proportions of materials used, polymerization conditions and physical properties of the resulting graft polymers are shown in Table 12. On the measurement of the gear oven stability in Runs Nos. 4 and 5, the test pieces could not be self-hold by draw-down at 180°C. Thus the test pieaces were inevitably placed horizontally on small glass plates set on a rotating ring of a gear oven tester.

Data of the impact strength and the tensile strength shown in Table 12 were plotted to obtain curves A and B in FIG. 4.

TABLE 12

| Run No. | 1 | 2 | 3 | 4 | 5 |
|---|---|---|---|---|---|
| PAO |  |  |  |  |  |
| Type | PPO | PPO | PPO | PPO | PPO |
| $[\eta]$ (dl/gr) | 2.9 | 2.9 | 2.9 | 2.9 | 2.9 |
| Amount (parts) | 2.0 | 2.0 | 2.0 | 2.0 | 2.0 |
| VCM |  |  |  |  |  |
| Amount (parts) | 100 | 97.3 | 94.5 | 89.4 | 85.0 |
| Comonomer |  |  |  |  |  |
| Type |  | Pr | Pr | Pr | Pr |
| Amount (parts) |  | 2.7 | 5.5 | 10.6 | 15.0 |
| Catalyst |  |  |  |  |  |
| Type | LII | LII | LII | LII | LII |
|  | LPO |  |  |  |  |
| Amount (part) | 0.045 | 0.08 | 0.12 | 0.20 | 0.20 |
|  | 0.015 |  |  |  |  |
| Polymerization Conditions |  |  |  |  |  |
| Temperature (°C.) | 66 | 54 | 51 | 48 | 48 |
| Time (hr:min) | 5 | 12 | 18 | 22 | 22 |
| Polymerization Results |  |  |  |  |  |
| Yield (%) | 83.0 | 82.5 | 80.7 | 72.1 | 58.2 |
| Apparent degree of polymerization | 920 | 935 | 865 | 693 | 572 |
| Properties of Molded Sheet |  |  |  |  |  |
| TS (kg/mm²) | 5.4 | 5.5 | 5.6 | 5.4 | 5.0 |
| IS (kg-cm) | 21 | 32 | 34 | 26 | 11 |
| Percent transmission (%) | 72.1 | 77.4 | 79.7 | 80.3 | 81.0 |
| Tf (°C.) | 183.5 | 169.6 | 167 | 154.2 | 146.3 |
| Gear oven stability (min) | 55 | 125 | 130 | 125* | 120* |

* : the measurement was conducted by placing the sample on a glass plate horizontally set.

Curves a, b, c and p in FIG. 1 indicate the relation between the impact strength of polymer compositions obtained by graft polymerizing 100 parts by weight of monomers to 2 parts by weight of polypropylene oxide as the trunk polymer and the intrinsic viscosity $[\eta]$ of the polypropylene oxide. The monomers used are as follows (parenthesized values indicate the weight percentile ratio of each monomer in the monomeric mixture used) :

Curve a   vinyl chloride (98.2) — ethylene (1.8)
Curve b   vinyl chloride (95) — propylene (5)
Curve c   vinyl chloride (96) — 1-butene (4)
Curve p   vinyl chloride (100)

Curves d, e and q in FIG. 2 are similar to curves given in FIG. 1 and relate to polymer compositions obtained by employing 1.5 parts by weight of polypropylene oxide (curves d and q) or a copolymer of propylene oxide and 1-butene (curve e) as the trunk polymer. The monomers used are as follows (parenthesized value indicate the weight percentile ratio of each monomer in the monomeric mixture used) :

Monomer(s) used

Curve d   vinyl chloride (94) — isobutene (6)
Curve e   vinyl chloride (94.5) — propylene (5.5)
Curve q   vinyl chloride (100)

Curves f and r given in FIG. 3 are similar to those given in FIGS. 1 and 2 and relate to polymer compositions obtained by using 1 part by weight of polypropylene oxide (curve r) and a copolymer of propylene oxide and epichlorohydrin (curve f) as the trunk polymer. The monomers used are as follows (parenthesized value indicate the weight percentile ratio of each monomer in the monomeric mixture) :

Curve f   vinyl chloride (94.5–95) — propylene (5.5–6)
Curve r   vinyl chloride (100)

As is seen from the foregoing, each of curves p, q and r in FIGS. 1 to 3 relates to a comparative polymer composition obtained by using vinyl chloride alone as monomer.

When comparison of curves a, b and c with curve p in FIG. 1, curves d and e with curve q in FIG. 2 or of curve f with curve r in FIG. 3 is made, it will readily be understood that polymer compositions obtained by graft polymerizing a monomeric mixture of vinyl chloride and α-olefin selected from ethylene, propylene, 1-butene and isobutene to an oil-soluble polyalkylene oxide as the trunk polymer in accordance with the process of this invention have a higher impact strength than polymer compositions obtained by grafting vinyl chloride alone to a polyalkylene oxide as the trunk polymer, and that when the intrinsic viscosity $[\eta]$ of the polyalkylene oxide is within a range of from 1.3 to 4.5, especially from 1.5 to 4, there are obtained polymer compositions having good properties.

FIG. 4 indicates curves drawn by plotting data given in Table 12. The left ordinate designates the impact strength of the resulting polymer composition obtained in Example 11 (curve A) and the right ordinate designates the tensile strength of the resulting polymer composition (curve B), whereas the abscissa indicates the weight percentile ratio of propylene used as the α-olefin in the monomeric mixture. From these curves it will readily be understood that when propylene as the α-olefin is used in an amount specified in the invention, namely 0.5 – 10 percent by weight, preferably 2 – 9 percent by weight, there can be obtained a vinyl chloride polymer composition having high impact strength and tensile strength.

What we claim is:

1. A process for the preparation of a vinyl chloride polymer composition having an improved impact strength, which comprises (a) dissolving an oil-soluble polyalkylene oxide having an intrinsic viscosity $[\eta]$, measured in benzene at 35°C., of from 1.3 to 4.5 and selected from the group consisting of polypropylene oxide, poly-1-butylene oxide, a copolymer of propylene oxide and 1-butene oxide and a co-polymer of an alkylene oxide selected from propylene oxide and 1-butene oxide with epichlorohydrin, in a monomeric mixture consisting of 99.5 – 90 parts of a vinyl chloride monomer and 0.5 – 10 parts of a comonomer selected from the group consisting of ethylene, propylene, 1-butene and isobutene compounds, the amount of said oil-soluble polyalkylene oxide being 0.5 – 5 percent by weight based on the monomeric mixture, (b) emulsifying or suspending the resulting solution in water, (c) polymerizing the emulsified or suspended solution at a temperature of 30° – 80°C. in the presence of 0.01 – 5 percent by weight, based on the monomeric mixture, of a radical polymerization catalyst, and (d) recovering the resulting polymer composition.

2. A process as set forth in claim 1, wherein the oil-soluble polyalkylene oxide has an intrinsic viscosity $[\eta]$, measured in benzene at 35°C., of from 1.5 to 4.

3. A process as set forth in claim 1, wherein the monomeric mixture is one consisting of 98 – 91 parts of a vinyl chloride polymer and 2 – 9 parts of a comonomer selected from the group consisting of ethylene, propylene, 1-butene and isobutene.

4. A process as set forth in claim 1, wherein the oil-soluble polyalkylene oxide is dissolved in the monomeric mixture in an amount of 1 – 3.5 percent by weight based on the monomeric mixture.

* * * * *